United States Patent [19]

Czumak

[11] 4,248,507

[45] Feb. 3, 1981

[54] MULTIPURPOSE PHOTOGRAPHIC FILM HANDLING CASSETTE HAVING AN IMPROVED FILM PROCESSOR ARRANGEMENT

[75] Inventor: Frank M. Czumak, Derry, N.H.

[73] Assignee: Polaroid Corporation, Cambridge, Mass.

[21] Appl. No.: 108,413

[22] Filed: Dec. 31, 1979

[51] Int. Cl.³ ............................................. G03C 11/00
[52] U.S. Cl. .................................. 352/130; 352/78 R
[58] Field of Search ....................... 352/130, 72, 78 R

[56] References Cited

U.S. PATENT DOCUMENTS

| | | |
|---|---|---|
| 3,615,127 | 10/1971 | Land . |
| 3,623,417 | 11/1971 | Eloranta et al. . |
| 3,667,361 | 6/1972 | Meggs et al. . |
| 3,785,725 | 1/1974 | Batter et al. . |
| 3,800,306 | 3/1974 | Land . |
| 3,806,245 | 4/1974 | Land et al. . |
| 3,809,465 | 5/1974 | Mason . |
| 3,895,862 | 7/1975 | Stella et al. . |
| 3,999,844 | 12/1976 | Batter . |
| 4,003,064 | 1/1977 | Mason . |
| 4,105,307 | 8/1978 | Holmes et al. . |
| 4,110,018 | 8/1978 | Finnemore . |

Primary Examiner—Monroe H. Hayes
Attorney, Agent, or Firm—Frederick A. Goettel, Jr.

[57] ABSTRACT

A fluid applicator is provided for depositing a coating of processing fluid on a moving run of photographic film strip which includes a single fluid reservoir which comprises an integrally formed nozzle assembly which includes an opening through which processing fluid may be released and a downwardly facing doctoring conformation for expressing the desired layer of processing fluid upon the film strip emulsion. A processing fluid sealing tear tab is positioned directly upon the downwardly facing surface of the processor and is sealingly engaged therewith by a suitable adhesive material. The tear tab is provided with means attached thereto at one end for assuring removal of substantially all of the adhesive material carried by the doctoring conformation upon removal of the tear tab to thereby assure a substantially clean adhesive free surface to be presented to the film strip during the processing fluid deposition.

3 Claims, 7 Drawing Figures

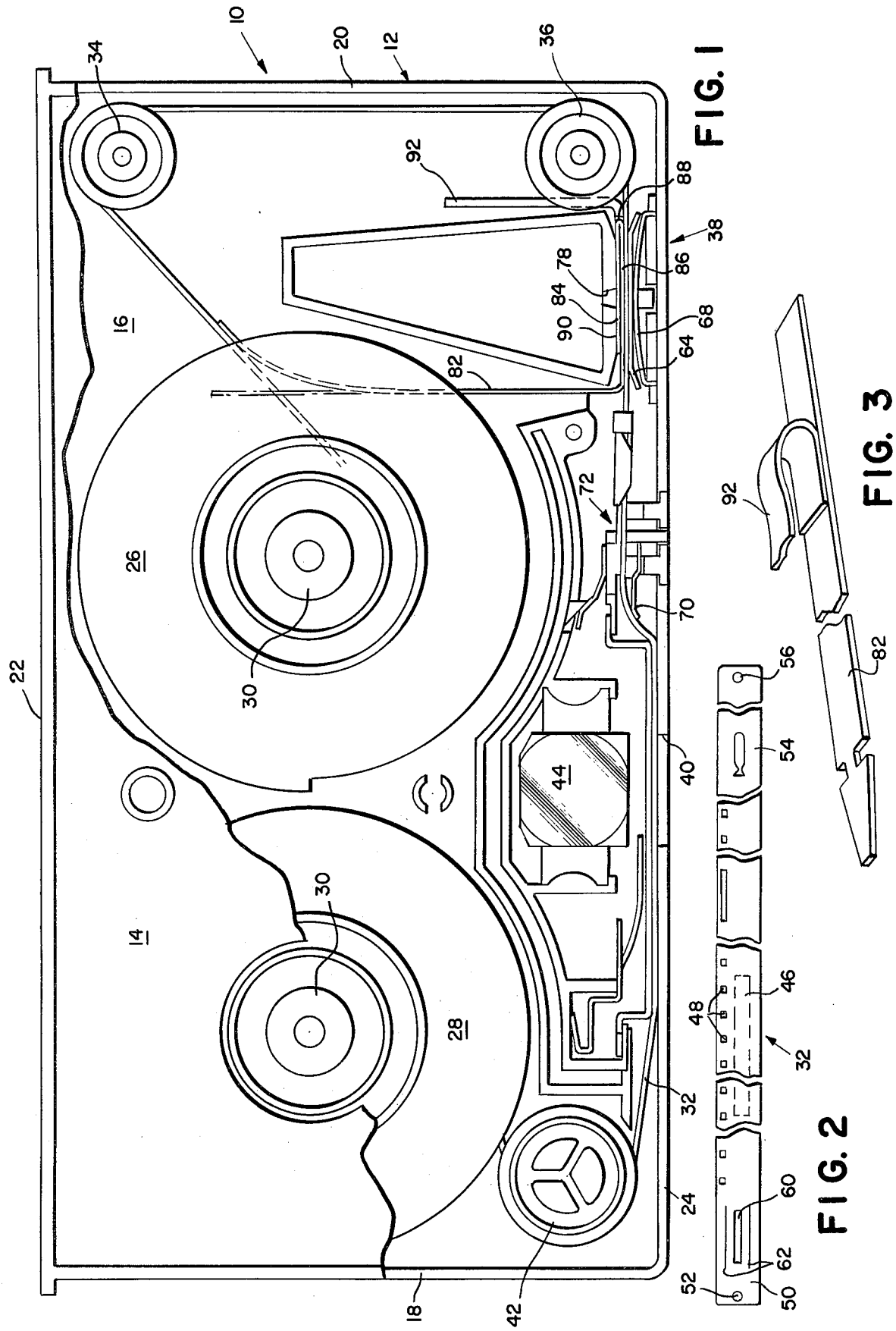

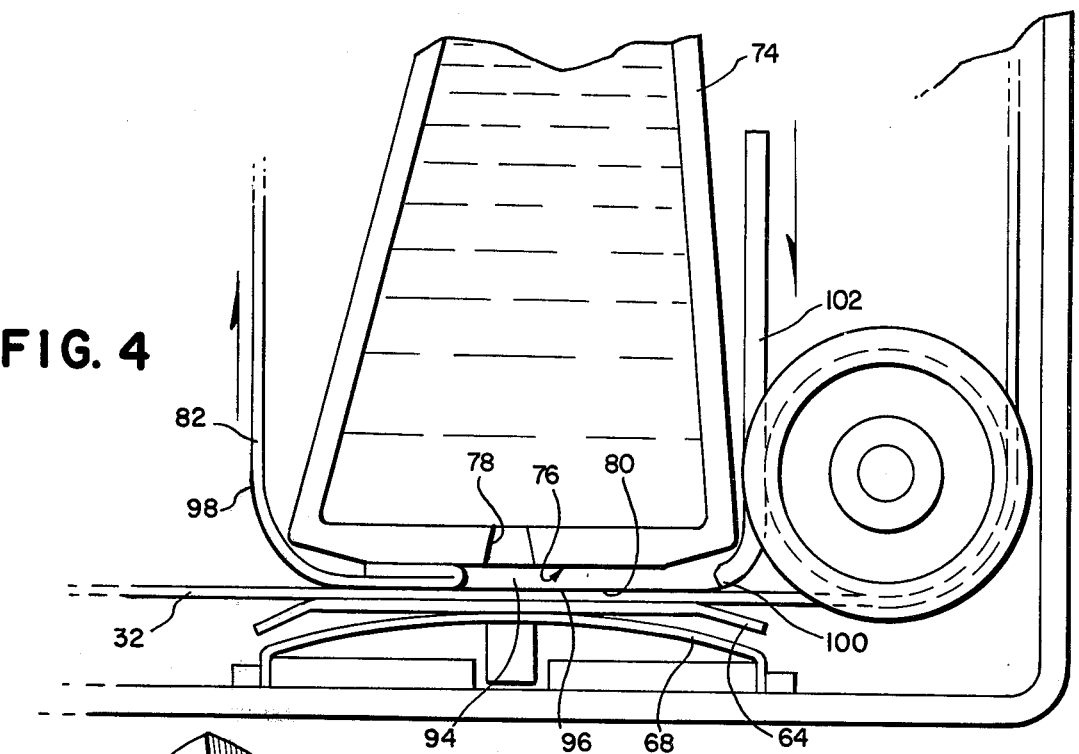
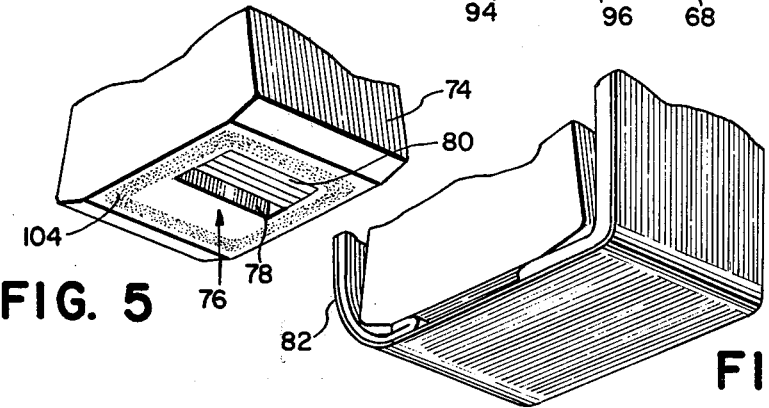
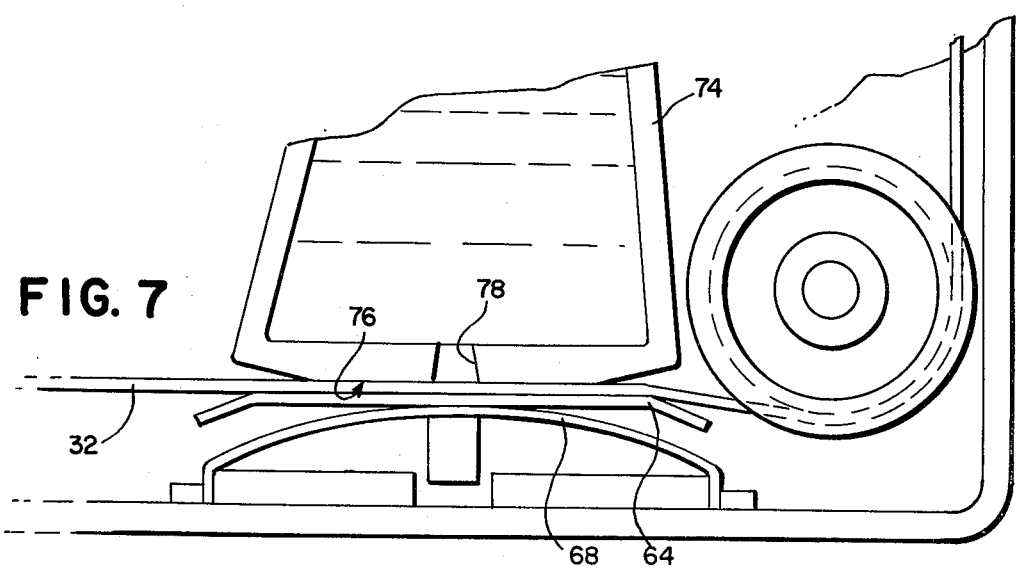

MULTIPURPOSE PHOTOGRAPHIC FILM HANDLING CASSETTE HAVING AN IMPROVED FILM PROCESSOR ARRANGEMENT

BACKGROUND OF THE INVENTION

This invention relates to multipurpose photographic film handling cassettes in which an exposed film strip contained in the cassette may be processed, viewed by projection and rewound automatically without removal from the cassette in accordance with information supplied by the condition of the cassette and the film strip contained therein. More particularly, it concerns an improved arrangement for the initially sealed processing fluid containing reservoir arrangement which forms part of the film processing organization of such cassettes.

Multipurpose photographic film cassettes have been developed for use in cinematographic systems illustrated and described, for example, in U.S. Pat. No. 3,615,127 issued to Edwin H. Land on Oct. 26, 1971; U.S. Pat. No. 3,623,417 issued Nov. 30, 1971, to Vaito K. Eloranta; U.S. Pat. No. 3,785,725 issued Jan. 15, 1974 to John F. Batter, et al.; U.S. Pat. No. 3,895,862 issued July 22, 1975 to Joseph A. Stella, et al.; and U.S. Pat. No. 4,105,307 issued to William A. Holmes, et al. on Aug. 8, 1978, all of which are owned by the assignee of the present invention.

In such systems, a strip of photographic film contained a cassette can be exposed in a camera adapted to receive the cassette and then processed to provide viewable images by placing the cassette in a viewing apparatus equipped to activate a cassette-contained processor upon rewinding the exposed film strip. After processing in this manner, the viewing apparatus is operated as a projector to advance the film incrementally frame by frame past a light source so that the scene to which the film was exposed is reproduced in a manner well known in the motion picture art.

In systems of the type aforementioned, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed reservoir or pod housed within the film cassette. The reservoir is provided with a removable tear tab closure capable of being opened upon activation of the processor by the viewing apparatus to allow the fluid to escape from the pod and pass through a nozzle-like opening against the exposed emulsion layer on the film strip. Although the processor is operated only once in only single cassette, the housing of which provides a permanent container for the film strip therein, its operation to achieve a uniform and complete layer of processing fluid over the exposed emulsion layer on the film strip is vital to satisfactory operation of the overall system since any defect in the operation of the processor will result in undesirable and permanent blemishes plainly observable during projection of the processed film.

In such systems, the processing fluid reservoir has been provided with a substantially vertically extending opening covered by a releasably bonded tear tab closure capable of being completely peeled from the opening to release the processing fluid for distribution against the emulsion layer of the exposed film strip. In prior systems of the type mentioned above, the tear tab initially sealing the processing fluid reservoir extends from one end of the reservoir opening to the other at which it is folded back upon itself to facilitate the removal thereof by pulling the folded-back portion.

As described in the above-noted U.S. Pat. No. 3,895,862, no viewer-mounted or other external means is needed for effecting the release of processing fluid from the initially sealed storage reservoir to initiate the processing cycle automatically upon rewinding the film strip after exposure in the cassette. The release of processing fluid from the reservoir is brought about by a pull strip extension connected at one end to the folded-back portion of the reservoir sealing tear tab and having at its free end, a configuration adapted to engage an aperture formed in the trailing end portion of the film strip attached to the supply spool during initial rewind rotation of the supply spool. The pull strip, which may be mylar or other similar material having the physical characteristics of a photographic film strip, is initially supported and constrained to an essentially S-shaped tortuous path in which the intermediate leg is established by a channel formed by internal cassette walls. The pull strip accordingly extends initially upward in confronting relation with the tear tab, then makes a downward turn passing through the aforementioned channel and makes a second turn at the lower end thereof before exiting from the channel. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull strip will move inwardly due to the diminishing diameter of film strip convolutions on the supply spool until the film strip is completely exposed. At this time, an aperture in the supply spool connected trailing end portion of the film strip will have passed the free end of the pull strip extension so that upon rewinding of the film strip back onto the supply spool, a latching tongue at the free end of the pull strip will engage in the film strip aperture and become entrained between successive convolutions of the film strip supply spool trailing end portion. Continued rewind rotation of the supply spool will effect a pulling action on the pull strip causing it to advance through the S-shaped tortuous path and correspondingly, resulting in peeling of the tear tab closure from the processing fluid resevoir to release the processing fluid for application thereof to the exposed film strip. After having been peeled completely from the processing fluid reservoir, the tear tab is disengaged from the pull strip by a knife-like formation at the exit of the channel formed by the internal cassette walls. The removed tear tab closure will remain in a storage chamber defined by the channel once the processing cycle has been complete.

In order to define the above-noted S-shaped path at the processing station, a plurality of internal cassette transverse wall formations which form an integral part of the cassette have been necessitated. Further wall formations have been utilized in order to define a pair of chambers, one communicating to the processing fluid applicator nozzle and a second defining an initially sealed reservoir for the processing fluid which opens along one upright side of this chamber at a planar face to which the releasable tear tab closure is initially fixed.

In practice, the fluid chamber actually provides an internal receptacle for a prefabricated and self-contained pod of processing liquid to which the tear tab closure is affixed. In this way, cassette assembly is facilitated by placing the pod in the chamber, threading the tear tab through the S-shaped path and then sealingly attaching a reservoir top to the upstanding wall formations defining the S-shaped path and the pair of fluid chambers.

It should be appreciated, accordingly, that in order to achieve reliable operation of such a processor, careful attention to assembly of the processor is necessary; the concomitant cost associated with such assembly is not insignificant.

In order to assure reliable separation of the tear tab from the processing fluid reservoir, a number of arrangements have been implemented in order to minimize drag as the pull strip passes through its path. One such example is illustrated in U.S. Pat. No. 4,110,018 to F. M. Finnemore and assigned to the assignee of the present invention wherein low friction guide arrangements are provided to guide the pull strip along its desired path. Such an arrangement, of course, requires added piece parts, additional assembly steps and accordingly, further added cost to the final assembled cassette.

SUMMARY OF THE INVENTION

The present invention relates to an applicator for depositing a coating of processing fluid on a moving run of photographic film strip which includes a single fluid reservoir which comprises an integrally formed nozzle assembly comprising an opening through which processing fluid may be released and a downwardly facing doctoring conformation for expressing the desired layer of processing fluid upon the film strip emulsion. A processing fluid sealing tear tab is positioned directly upon the downwardly facing surface of the processor and is sealingly engaged therewith by a suitable adhesive material. The tear tab is provided with means attached thereto at one end thereof for assuring removal of substantially all of the adhesive material carried by the doctoring conformation upon removal of the tear tab to thereby assure a substantially clean adhesive-free surface to be presented to the film strip during the processing fluid deposition process.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a side elevation of the film cassette of this invention with the front wall thereof cut away and other portions thereof in partial section to illustrate the internal working components;

FIG. 2 is a fragmentary plan view of the film strip to be used in the cassette shown in FIG. 1;

FIG. 3 is an enlarged fragmentary plan view of the processor sealing tear tab and the attached adhesive removal strip;

FIG. 4 is an enlarged view of the processor region of the cassette of FIG. 1 showing the tear tab partially removed from the processor exterior surface;

FIG. 5 is an enlarged perspective view of the lower surface of the processor housing;

FIG. 6 is an enlarged perspective view of the lower end of the processor housing with the tear tab partially removed; and FIG. 7 is a view similar to FIG. 3 showing the processor with the tear tab removed and in operative engagement with the film strip.

DESCRIPTION OF THE PREFERRED EMBODIMENT

In the drawings, a multipurpose cassette incorporating the improvement provided by the present invention is generally designated by the reference numeral 10. As shown in FIG. 1, the cassette includes a generally parallelepiped casing or housing 12 established by planar faces or side walls 14 and 16, end wall 18 and 20, and elongated top and bottom edge walls 22 and 24, respectively. A pair of spools respectively designated hereinafter as supply spool 26 and takeup spool 28 are supported for rotation in coplanar relationship by suitable supporting structure (not shown) provided in the side walls 14 and 16. Each spool is provided with a drive socket 30 for engagement by appropriate drive shafts in either of the camera (not shown) or the viewing/processing apparatus (not shown) with which the cassette is used in accordance with the overall system described in the prior references cited above. Each of the spools is provided with a central hub (not shown) to which opposite ends of a film strip 32 are permanently connected. The path of the film strip 32 in the housing 12 extends from the hub of the supply spool 26 about guide rollers 34 and 36 across a normally inoperative film processing station 38, an opening 40 in the bottom edge wall 24, about a further guide roller 42 and to the hub of the takeup spool 28. The opening 40 functions at different times to facilitate both exposure and projection of the film strip 32, a prism 44 being located behind the film strip at the opening 40 to facilitate the latter operation.

The film strip 32 functions as an operating component in the cassette over and above its principal function of recording photographic images and is shown in its full length in FIG. 2 of the drawings. As shown, the film is provided with a major central portion 46 of usable film upon which projectable images may be formed. To this end, the film strip includes a carrier base of any suitably strong transparent material carrying an emulsion or photosensitive coating of any conventional variety; for example, an emulsion developed by a monobath processing composition to form a positive transparency suitable for projection. Also, a series of uniformly spaced sprocket holes 48 are provided along the length of the film to facilitate incremental film advance during exposure and projection. At least the carrier base of the strip extends beyond the end of the central portion of the usable film 46 to provide at one end a leading end portion (takeup leader) 50 having an aperture 52 by which the takeup leader may be permanently affixed to the hub of the takeup spool 28. A trailing end portion (supply leader) 54 at the opposite end of the strip is similarly provided with an aperture 56 for permanent connection to the hub of the supply spool 26. The strip is additionally provided with an elongated sprocket hole 58 of the approximate and proportionate length illustrated in FIG. 2, for the purpose of interrupting advance travel of the strip by the incremental drive mechanisms provided in the camera (not shown) and the projecting apparatus (not shown) with which the cassette is used. The film strip is further provided in its takeup end 50 with a configuration comprising a centrally disposed opening 60 flanked by a pair of elongated slots 62.

Turning again to FIG. 1, a balanced pressure pad 64 supported by a bowed spring 66 retains the film strip 32 in operative relation to a processing fluid applicator nozzle 68 during processing. Additionally, the opening 60 and the slots 62 (see FIG. 2) function at the end of the processing cycle to engage a finger 70 carried at one end of a valve member 72 and serve to move the valve member responsive to movement of the film strip to seal the nozzle 68 at the processor station 38 at the end of the processing cycle. The operation of the balanced pressure pad 64 and spring 66 is more fully described in U.S. Pat. No. 3,951,530 issued to Frank M. Czumak, et al. on Apr. 20, 1976. Further, a bowed pressure pad spring arrangement which may be used with the present invention is shown and described in copending U.S. patent application Ser. No. 26,908, filed Apr. 4, 1979, also assigned in common with the present invention.

The processing station sealing operation by the valve 72 is also more fully described in the aforementioned U.S. Pat. No. 3,785,725 and in U.S. Pat. No. 3,868,716 issued on Feb. 25, 1975, to Irving S. Lippert, et al., also owned by the assignee of the present invention. Since the above-noted patents fully describe these operations, no further detailed discussion will be presented here and only those aspects necessary for an understanding of the present invention will be discussed.

With reference now primarily to FIGS. 1 and 4, it will be seen that the fluid applicator according to the present invention comprises a unitary six-sided fluid housing or reservoir 74 which tapers from a narrow dimension at its upper end to a larger dimension at the other end thereof and having a lower downwardly facing exterior surface 76 which actually defines the nozzle opening 78 through which the processing fluid passes to the film strip. The downwardly facing surface 76 further comprises a portion thereof, a doctoring conformation 80, which serves to deposit the processing fluid in the desired thickness upon the film strip emulsion bearing surface.

It accordingly should be evident that the processor of the present invention is initially assembled by first filling the fluid reservoir 74 with the desired quantity of processing fluid through the nozzle opening 78 and then sealingly applying a tear tab closure 82 to the fluid applicator surface. The tear tab 82 comprises a first length 84 thereof which initially sealingly engages a portion of the downwardly facing surface 76 of the housing to seal the processing fluid therein. The first length of tear tab extends from left to right as viewed in the above-noted drawing figures. The tear tab 82 further includes a second length 86 thereof which is folded back upon the first length at a fold 88 and which extends therefrom to a location with respect to the film strip, as shown in FIG. 1, in a manner such that it may cooperate with the film strip and be removed from the sealing engagement with the downwardly facing surface 76 in accordance with the teachings of U.S. Pat. No. 3,785,725.

Sealing engagement between the first length 84 of the tear tab 82 and the downwardly facing surface 76 of the processor may be achieved by applying a sealing adhesive or other suitable material to the regions surrounding the nozzle opening 76. Of course, the sealing material may also be applied to the upwardly facing surface 90 of the first length of the tear tab prior to positioning it on the housing. It should be appreciated that in order to minimize the quantity of such adhesive material remaining on the downwardly facing surface 76 of the reservoir, it is desirable to make the material selectively more adherent to the material from which the tear is made which, for example, may be mylar or a foil material. Such arrangement will result in most of the adhesive material being removed from the downwardly facing surface 76 of the processor upon removal of the tear tab therefrom.

It should be appreciated, however, that not all of the adhesive material will at all times be carried from the processor face 76 by the removal of the tear tab and, accordingly, means are provided for operatively engaging at least the sealing portion of the downwardly facing surface 76 of the reservoir 74 which has the adhesive applied thereto and to operatively engage during the advancement of the tear tab such portion of the surface to thereby assure removal of substantially all of the adhesive upon removal of the tear tab from the processor surface. As illustrated in FIG. 1, the adhesive removing means comprises an elongated strip of material 92 attached to the tear tab 82 at the fold 88 where the second length is folded back over the first length. The elongated strip 92 is fabricated from a material which is selectively more adherent to the adhesive than the adhesive is adherent to the material from which the downwardly facing surface 76 and the doctoring conformation 80 of the processor is fabricated. Such arrangement assures substantially complete removal of the adhesive from the surface 76 as the adhesive removing strip 92 is drawn thereacross responsive to advancement of the tear tab from the sealing surface.

As shown in FIGS. 1 and 2, the adhesive removal strip comprises a strip of such selectively adherent material attached to the tear tab at the fold point 88 and which adhesive removing material will immediately begin to advance into the space 94 between the downwardly facing surface 76 and the film strip 32 upon initiation of advancement of the tear tab 82.

Referring to FIG. 4, a similar but somewhat different arrangement is illustrated wherein attachment of the adhesive removal means 92 to the film strip 32 is accomplished by a substantially thinner substrate material 96 which extends as a leader for a substantial distance from the point 98 illustrated to the left of the reservoir in FIG. 3 back to a location 100 to the right of the reservoir wherein the substrate is coated with the selectively adherent material 102 for adhesive removal. Such an arrangement is desirable in that, as is evident from FIG. 3, it will be seen that the point where the elongated strip 96 is attached to the film strip 32 proceeds along with the film strip in a path lying under the tear tab. As a result, it is desirable to have the thin leader material 96 thereunder until a substantial portion of the tear tab has been advanced to the left for removal purposes as illustrated in FIG. 3 wherein the adhesive removing material 102 is just about to move into operative engagement with the downwardly facing surface 76. It should be appreciated that such operation, in practice, occurs extremely fast and that the probability of leaking of processing fluid from the reservoir through the opening 78 during such operation is not great.

To further enhance the above description, FIG. 5 is provided to show a potential quantity of adhesive residue 104 on the downwardly facing surface 76 of the processor housing 74. FIG. 6 illustrates the relative relationships of the tear tab 82 and the adhesive removing means 92 with the tear tab 82 substantially removed and the adhesive removing means having moved into contact with the residual adhesive. FIG. 7 illustrates the processor of the present invention in its operative position wherein the tear tab and the adhesive removing means have both been advanced from their respective operative positions and have been advanced upon the supply spool in an interleaved fashion with the supply leader. Accordingly, continued advancement of the film strip to the right as viewed in FIG. 7 will result in deposition of the processing fluid upon the film strip surface as is well known in the art.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. An applicator for depositing a coating of processing fluid on a moving run of a photographic film strip, the applicator comprising:

a fluid reservoir having an exterior wall carrying an opening therein through which processing fluid may pass, said exterior wall also defining a doctoring conformation adjacent said opening which is configured to deposit a coating of processing fluid on the moving run of film as it is advanced therepast in confronting relationship therewith;

a tear tab having a first length thereof located to be between said exterior wall and said moving run of film and having a sealing surface configured to engage a sealing portion of said exterior wall extending around the perimeter of said opening and at least a portion of said doctoring conformation, said tear tab being configured for facilitating a fluid-tight seal to said sealing portion of said exterior wall to initially seal processing fluid within said reservoir and, upon advancement of said tear tab relative to said reservoir, for effecting release of the fluid contained therein;

an adhesive material located between the sealing portion of said exterior wall and said sealing surface of said tear tab for effecting said fluid-tight seal; and adhesive removing means attached to said tear tab so as to be drawn across and operatively engage, during advancement of said tear tab, at least the sealing portion of said exterior wall and the adhesive located thereon to thereby remove at least a portion of said adhesive upon such advancement of said tear tab whereby a relatively clean area of said exterior wall is presented to said moving run of film.

2. The applicator of claim 1 wherein said tear tab includes a second length folded back over said first length to be between said first length and said moving run of film such that the advancement of said second length along said first length peels said first length from said exterior wall, and said adhesive removing means comprises an elongated strip of material connected to said tear tab at the fold where said second length is folded back over said first length.

3. The applicator of claim 2 wherein the surface of said elongated strip of material which comes into contact with said portion of said doctoring conformation is selectively more adherent to said adhesive than said adhesive is adherent to the material from which said doctoring conformation is fabricated.

* * * * *